A. J. DIEFENDERFER.
WIND SHIELD SUPPORT.
APPLICATION FILED APR. 30, 1915.
1,211,420.
Patented Jan. 9, 1917.
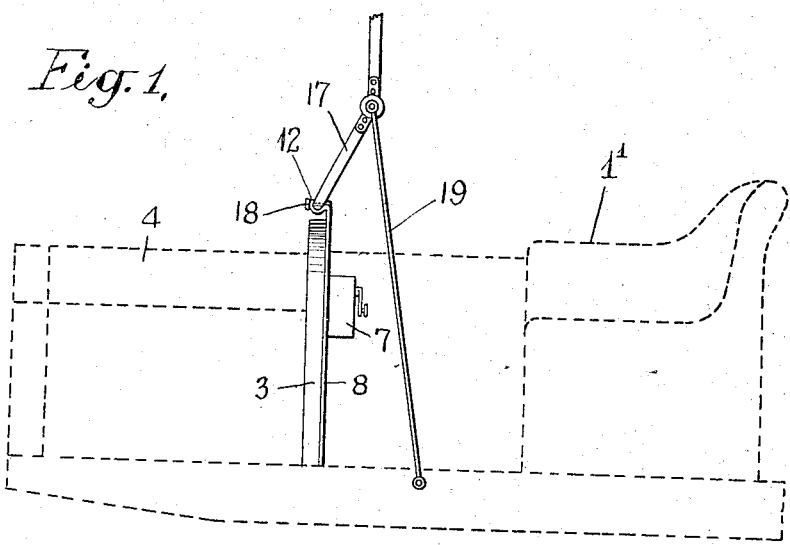
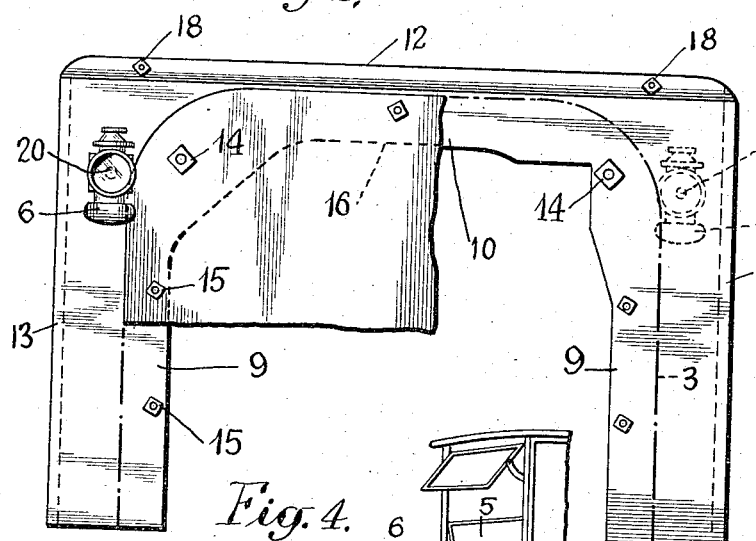
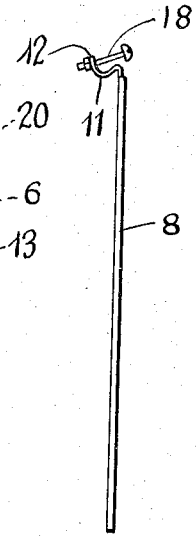
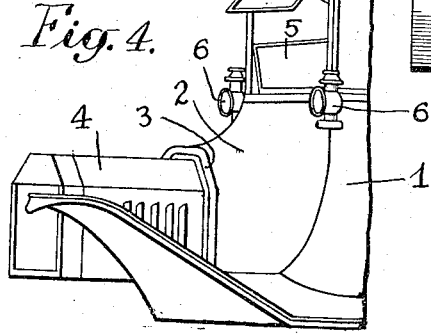
INVENTOR
A. J. Diefenderfer
BY
ATTORNEY

UNITED STATES PATENT OFFICE.

ALFRED J. DIEFENDERFER, OF BRONXVILLE, NEW YORK, ASSIGNOR TO HAYES DIEFENDERFER CO., INC., OF NEW YORK, N. Y., A CORPORATION OF NEW YORK.

WIND-SHIELD SUPPORT.

1,211,420.

Specification of Letters Patent.   Patented Jan. 9, 1917.

Application filed April 30, 1915.   Serial No. 24,927.

*To all whom it may concern:*

Be it known that I, ALFRED J. DIEFENDERFER, a citizen of the United States, residing at Bronxville, in the county of Westchester and State of New York, have invented certain new and useful Improvements in Wind-Shield Supports, of which the following is a specification.

My invention relates to wind shield supports and particularly to an attachment which may be secured to the permanent dash of an automobile, when the body of a pleasure car has been removed and a commercial body substituted therefor.

The attachment comprises a plate of sheet-metal having vertical side portions adapted to be secured to the inner side edges of the dash and a transverse upper portion, having at its upper edge an approximately U-shaped flange in which the lower edge of the wind shield may be supported. The vertical and transverse portions of the attachment overlap the side and top edges of the dash, the front lamps which may be removed from the pleasure body being secured to the overlapping side portions of the sheet-metal support.

My improved attachment is particularly adapted as stated for use in the transformation of a pleasure vehicle to a commercial vehicle by the substitution of a commercial body for the pleasure body. It is particularly designed for use in a car in which the pleasure body, which has been removed, is provided with what is known as a "stream-line cowl", extending rearwardly from the dash, the wind shield regularly provided with such body being secured in position to the rear of the cowl. In such a case, when the pleasure body is removed and a commercial body substituted therefor, there is nothing to which the wind shield to be used with the transformed car may be secured.

My improved attachment is readily and quickly secured to the inner side of the dash to which it is bolted with very little labor, the bolt-holes in the dash through which the pleasure body was secured in place being utilized together with a few additional drilled holes. The attachment is so formed as to straddle the coil-box and other devices mounted upon the inner side of the dash so that the connections of the same need not be changed when the attachment is fitted in place.

Other advantages of my construction will appear hereinafter.

The object of my invention accordingly is to provide a device such as described as an attachment for an automobile, and also the combination of the same with the permanent parts of the automobile with which it coacts and the wind shield supported by the attachment.

In order that a clearer understanding of my invention may be had, attention is hereby directed to the accompanying drawings forming part of this application and illustrating certain embodiments of my invention.

In the drawings, Figure 1 represents a partial side elevation of an automobile having a commercial body with my improved wind shield support mounted in position thereon, Fig. 2 is an elevation of my attachment viewed from the front of the car, Fig. 3 is a side view of the same, and Fig. 4 is a partial side elevation of an automobile having a pleasure body which may be transformed into a commercial machine by the substitution of a commercial body for the pleasure body shown.

Referring to the drawings, the pleasure vehicle shown in Fig. 4 is represented as having a body 1 provided at its forward end with the stream-line cowl 2 which is secured to the dash 3, interposed between the body of the car and the bonnet 4. The wind shield 5 is shown supported in position in the front of the body to the rear of the cowl and a side lamp 6 is shown mounted to the frame of the body immediately in front of the wind shield. The coil-box 7 is shown in Fig. 1 mounted on the inner side of the dash 3.

When a pleasure vehicle, such as is shown in Fig. 4, is received from the manufacturer, it is sometimes advisable to remove the body 1 including the cowl 2 and substitute a commercial body, such as is indicated at 1' in Fig. 1. With this commercial body the wind shield should be mounted above the dash 3, and this is readily accomplished by my invention. The wind shield support 8 is formed of sheet-metal to have approximately the form shown in Fig. 2 with vertical side portions 9, 9 at the two sides thereof, and a transverse portion 10 at the top connecting the vertical side portions. The transverse portion 10 is formed with an approximately U-shaped flange 11 at its upper edge having a forwardly directed edge 12. Preferably, the side portions 9 of the support are bent over or provided with a rib at their outer edges as shown at 13, 13, to strengthen the construction. In assembling the device, the support 8 is placed against the inner side of the dash 3 with the transverse portion 10 of the support above the coil-box 7 and the vertical portions 9 of the support on either side of the coil-box, so that the electrical connections of the coil-box need not be disturbed in mounting the support. The support is bolted to the dash by a pair of bolts 14, 14, which extend through drilled holes in the support in line with the bolt-holes in the dash 3, which were used in securing the body 1 of the pleasure vehicle to the dash. A number of additional bolts 15 are also used extending through holes drilled through the vertical portions 9 of the support adjacent to the inner edge thereof and one or more bolts 16 extending through holes drilled in the transverse portion 10 of the support and the portion of the dash 3 in line therewith. The side and top portions of the support preferably overlap the side and top edges of the dash, the outline of the dash being shown in dotted lines in Fig. 2. The bolts or securing means by which the support is secured to the dash may extend through the edge portions of the latter about the hood 4. The wind shield shown at 17 is then mounted in position with its lower edge resting in the U-shaped flange 12 of the support. A number of bolts 18 are extended through the forward edge 12 of the U-shaped flange and through the lower edge of the frame of the wind shield to hold the same, the wind shield being additionally supported by a pair of rods 19 secured to the upper part of the same and to the frame of the car as shown.

The lamps 6 removed from the pleasure body of the machine may be mounted upon the wind shield support 8 by extending the supporting screws at the rear of the lamps through drilled holes 20 in the support. These holes 20 are located one at each side of the dash 3, in the overlapping portions of the wind shield support. The screws or bolts by which the lamps are normally supported from the pleasure body of the car are very short, so that it would not be possible to mount the same from the dash 3, which is of greater thickness than the effective length of the bolts beyond the rear surfaces of the lamps, without substituting longer bolts which would necessitate taking the lamp apart. The thickness of wind shield support 8 is only that of a stiff sheet of metal and therefore the lamps may be quickly and conveniently mounted, as stated, on the support by means of the original bolts of the lamps.

It should be observed that my improved wind shield support or auxiliary dash is an integral one piece construction, which may be mounted in place quickly and readily, without the use of clamps and without altering or interfering with the connections of the coil-box and other attachments secured to the permanent dash, and that the device when secured in position is effective for the desired purpose and presents an attractive appearance.

Having now particularly described my invention, what I claim and desire to protect by Letters Patent is as follows:

1. In commercial automobile construction, the combination with the permanent dash having a coil-box on the inner side thereof, of a sheet-metal support fitted against the inner side of said dash having vertical side portions extending downwardly on each side of said coil-box, a transverse upper portion above said coil-box, and a forwardly bent U-shaped flange at the upper edge of said transverse portion extending above said dash, a wind shield having its lower edge supported in said U-shaped flange, and rods for supporting the upper part of said wind shield from the frame of the automobile, substantially as set forth.

2. In commercial automobile construction, the combination with a permanent dash having a coil-box on the inner side thereof, of a sheet-metal support fitted against the inner side of said dash having vertical side portions on each side of said coil-box, a transverse upper portion above said coil-box, and a forwardly bent U-shaped flange at the upper edge of said transverse portion above said dash, said side and transverse portions overlapping the side and top edges respectively of said dash and being bolted thereto, said side portions having openings to receive the supporting screws of the front lamps, through the overlapping portions at each side of the dash, and a wind shield having its lower edge supported in said U-shaped flange, substantially as set forth.

This specification signed and witnessed this 26 day of April, 1915.

ALFRED J. DIEFENDERFER.

Witnesses:
  FREDK. FOWLER,
  THOMAS C. FRY.

Copies of this patent may be obtained for five cents each, by addressing the "Commissioner of Patents. Washington, D. C."